United States Patent [19]

Blach

[11] Patent Number: 4,474,474

[45] Date of Patent: Oct. 2, 1984

[54] CONTINUOUS HOMOGENIZATION AND MIXING OF PLASTIC MATERIALS

[76] Inventor: Josef Blach, Wilhelmstrasse 24, 7144 Asperg, Fed. Rep. of Germany

[21] Appl. No.: 413,491

[22] Filed: Aug. 31, 1982

[30] Foreign Application Priority Data

Sep. 1, 1981 [DE] Fed. Rep. of Germany ....... 3134479

[51] Int. Cl.³ .............................................. B29B 1/10
[52] U.S. Cl. ...................................... 366/85; 366/322
[58] Field of Search ...................... 366/85, 84, 83, 301, 366/302, 303, 322, 318; 425/201, 204, 208, 209

[56] References Cited

U.S. PATENT DOCUMENTS

| | | | |
|---|---|---|---|
| 3,122,356 | 2/1964 | Erdmenger | 366/85 |
| 3,195,868 | 7/1965 | Loomans | 366/85 |
| 4,136,251 | 1/1979 | Bice | 366/85 |
| 4,236,833 | 12/1980 | Blach | 366/85 |

Primary Examiner—Robert W. Jenkins
Attorney, Agent, or Firm—George E. Kersey

[57] ABSTRACT

Continuous homogenization and mixing of plastic material using a plurality of elements with worm threads having the same pitch direction. The elements engage one another to form a near fit and can be driven in the same sense. Each worm element is divided into successive disks, which correspond from element to element. The disks of each group of worm elements are turned by the same angle in the same sense. The front side surfaces of the disks which become free during rotation have centric shoulders with heights and widths that permit full movement of the respective frontal sides when the worm elements rotate.

10 Claims, 6 Drawing Figures

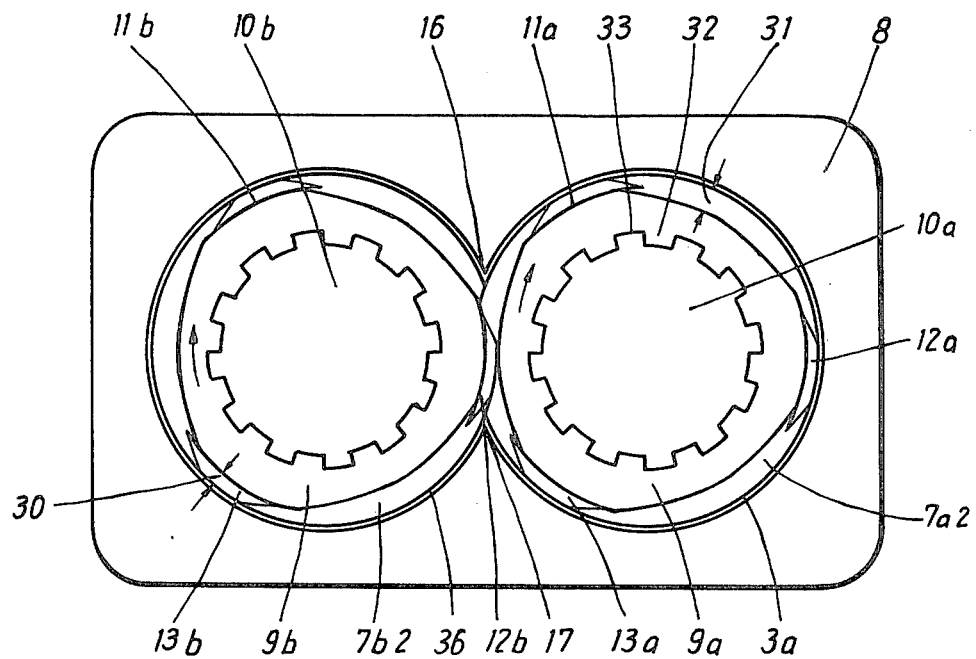
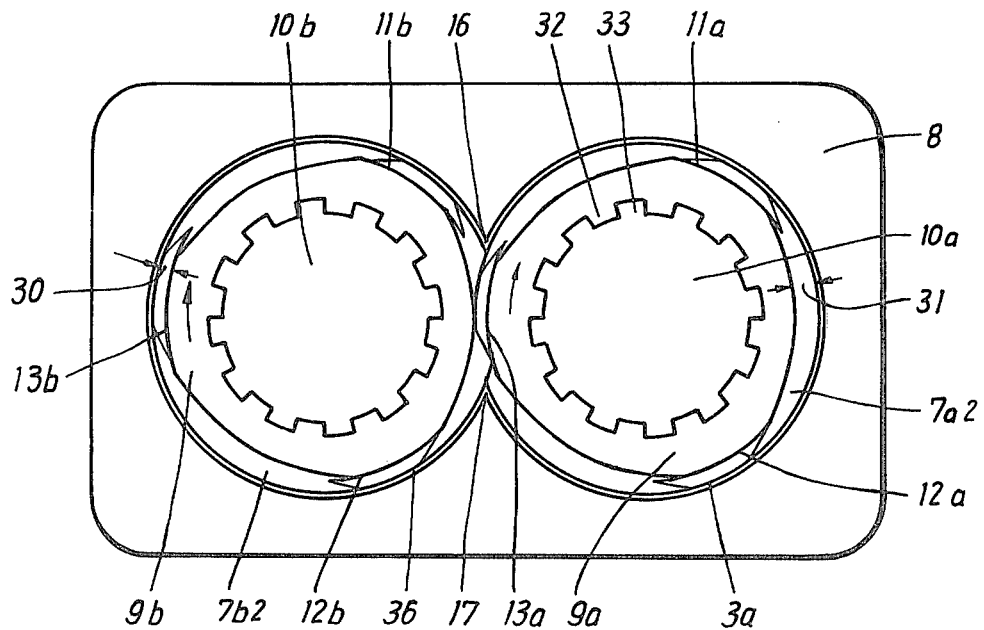

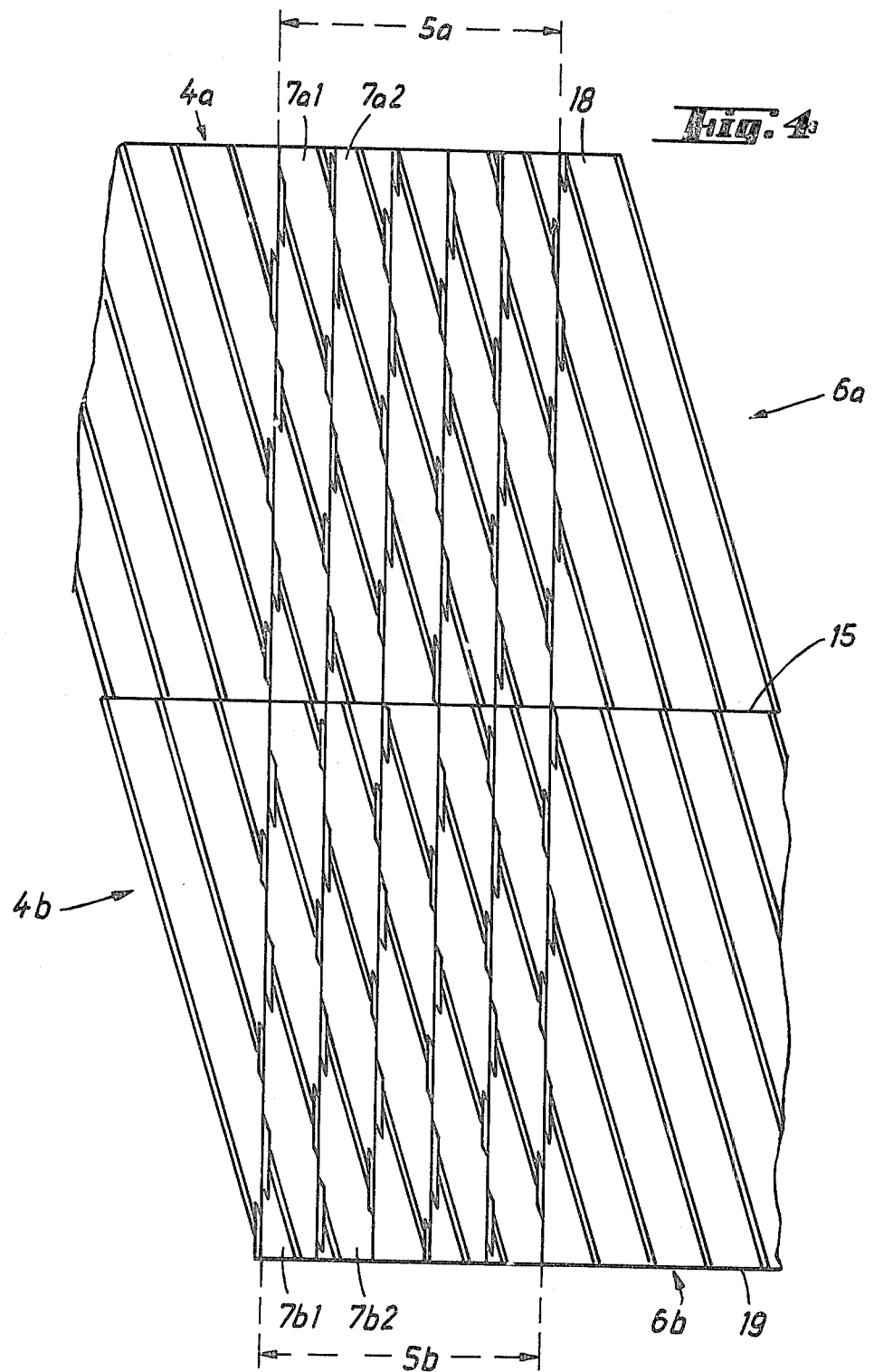

CONTINUOUS HOMOGENIZATION AND MIXING OF PLASTIC MATERIALS

BACKGROUND OF THE INVENTION

The invention relates to the continuous homogenization and mixing of plastic materials using axially parallel worm elements with the same pitch direction and near engagement with one another when driven in the same sense.

Such worm elements are known from German Offenlegungsschrift No. 2,003,593. Their special feature is that at each turn of a worm element, there is a sealing ridge which overarches the turn and is perpendicular to it. The external diameter of the sealing ridge corresponds to the diameter of the worm element. As a result, the pitch of the worm element is sealed in its throughflow direction. Because of the sealing ridge, a strong build-up of pressure takes place during each turn of the worm element. This initiates plastification of the material being processed. In order to give the sealing ridge of the neighboring worm element a necessary free space, the worm element has a corresponding recess at the position which moves past the sealing ridge as the worm element rotates. The recess interrupts the shear edge of the neighboring worm element, making it possible for the material being transported by the worm element to escape into a neighboring turn of that element. Consequently, the areas before the ridges and the recesses are the positions where the plastic materials essentially are acted upon.

Accordingly, it is an object of the invention to cause the positions of action on plastic materials, in the sense of homogenizing and mixing the materials, where the positions follow one another along the individual worm elements, to follow one another relatively densely.

Another object of the invention is to distribute the processing of the plastic materials as uniformly as possible over the respective length of the worm element, and in this way obtain a particularly homogeneous product.

Still another object of the invention is to shape the position of action in such a way that the action generally occurs in substantially the same manner.

A still further object of the invention is to avoid the undesirable effects which exist in the known devices. A related object is to avoid the particularly strong action at the ridges of known devices and, conversely the significantly weaker action through the recesses. Still another related object is to avoid action whose strength varies in alternation.

SUMMARY OF THE INVENTION

According to the invention, the foregoing and other objects are achieved by subdividing each worm element into successive disks. The disks of neighboring worm elements have the same thickness. Where two worm elements are used, their disks have pairwise the same thickness. Along each worm from one pair to the next, the disks are turned at an angle, and specifically, within one pair, are turned through the same angle in the same sense.

In accordance with one aspect of the invention, rotation of the disks causes their frontal side surfaces to become free. In the area of the free surfaces, centric shoulders are provided with a height and width that permit the respective frontal sides to move freely past one another when the worm elements turn.

Generally devices with several axially parallel worm elements have a multi-pitch design. Consequently, because of the rotation of the disks with respect to one another in the circumferential direction, a number of freed frontal side surfaces result from the rotation. The number of such surfaces is given by the pitch number. Consequently, the shoulders, which are situated in the area of the frontal surfaces, cause the plastic material that is being processed to be disturbed and split as it flows along the shear edge of the rotating worm element. The result is an intimate and thorough mixing at the action points. The effect of the action is to compress and shear the material being processed, which produces corresponding heating and thus serves further to plastify the material. The action points all have the same design, so that a uniform action on the plastic material is obtained for each pair of disks.

In this connection, another item of prior art, German Offenlegungsschrift No. 2,550,969 is to be noted. A device is disclosed there for homogenizing plastics by two mutally engaging worm shafts with polygonal portions. Because of the polygonal portions, the material being processed is transferred back and forth from one shaft to another. The polygonal portions are mutually turned longitudinally over each shaft, so that, when the shafts rotate, overlap areas of the polygonal portions result from shaft to shaft. In order to obtain, in the overlap areas, the desired action on the material that is being processed, each polygonal portion has a reduced width in the overlap areas, so that gaps result between the mutually engaging polygonal portions. The desired action on the material being processed then takes place in these gaps. However, this prior art does not point in the direction of the invention, since quite different circumstances prevail in the intermeshing of the worm elements than in the intermeshing of polygonal members.

In the case where worm elements intermesh, it is by no means clear that the overlap regions which result from the subdivision into disks, during their mutual rotation, will not disturb one another mutually so that rotation of the worm shafts thereby becomes impossible. However, surprisingly, it has appeared that worm elements can also be subdivided into mutually rotated disks. In this case, the conveyance action of the worm elements is an essential effect. This action practically does not exist at all in the case of the rotated polygonal members, while it is present in the case of worm elements according to the invention. To this phenomenon must be added the shearing and mixing action that occurs due to the frontal side surfaces that have become free during the rotation of disks which are equipped with shoulders. When worm elements with disks engage, an unexpected and conspicuous transfer effect occurs. This is based on the fact that constrictions and resulting compressions of the material during flow result for each flow channel of each worm element, a feature that is based on the mutual rotation of the disks.

In accordance with still another aspect of the invention, if the disks become thinner along the worm, the advantageous effect is obtained that the material which is conveyed, and which is compressed because of the homogenization, is subjected more and more frequently to processing by the freedup frontal side surfaces, since these frontal side surfaces then follow one another more closely.

In accordance with yet another aspect of the invention, it is possible to select the thickness of the disks along the worm elements in such a fashion that a thinner disk follows a thicker one, than again a thicker one, etc. This produces the effect that successive action points follow one another with alternatingly different closeness, which is advantageous for many purposes.

It is also possible to impart to successive disks respectively different worm pitches. In this way, the succession of action points can be influenced to avoid the possibility that the succession of action points will be axis-parallel. In such a case, non-uniform torques would result when the shafts rotate.

In order to promote the free movement of the frontal sides past one another when the worm elements rotate, the radial distance of the shoulders from the exterior worm surface corresponds to at least half the pitch height. By pitch height, in this context, is meant the radial distance between the external surface of the worm element and its axis.

Favorable conditions for the shearing and mixing action result especially when the axial width of the shoulders corresponds maximally to the pitch height.

In accordance with a still further aspect of the invention, the worm elements are constructed to make it possible to set every possible rotation of the disks with respect to one another. For that purpose the disks are placed on each worm element axle, optionally at various angular positions. During assembly, each disk is set with the particular angular position that is desired. This angular position can subsequently be changed by dismantling the disks from the worm axle.

DESCRIPTION OF THE DRAWINGS

Other aspects of the invention will become apparent after considering several illustrative embodiments, taken in conjunction with the drawings, in which:

FIG. 2 is a side sectional view showing a pair of disks along the section II—II of FIG. 1;

FIG. 3 is a further side view of the pair of disks of FIG. 2 after a rotation of both of their worm elements by an angle of 60°;

FIG. 4 is a view of portions of the unwound external surfaces of the worm elements of FIG. 1;

DETAILED DESCRIPTION

Figure 1:
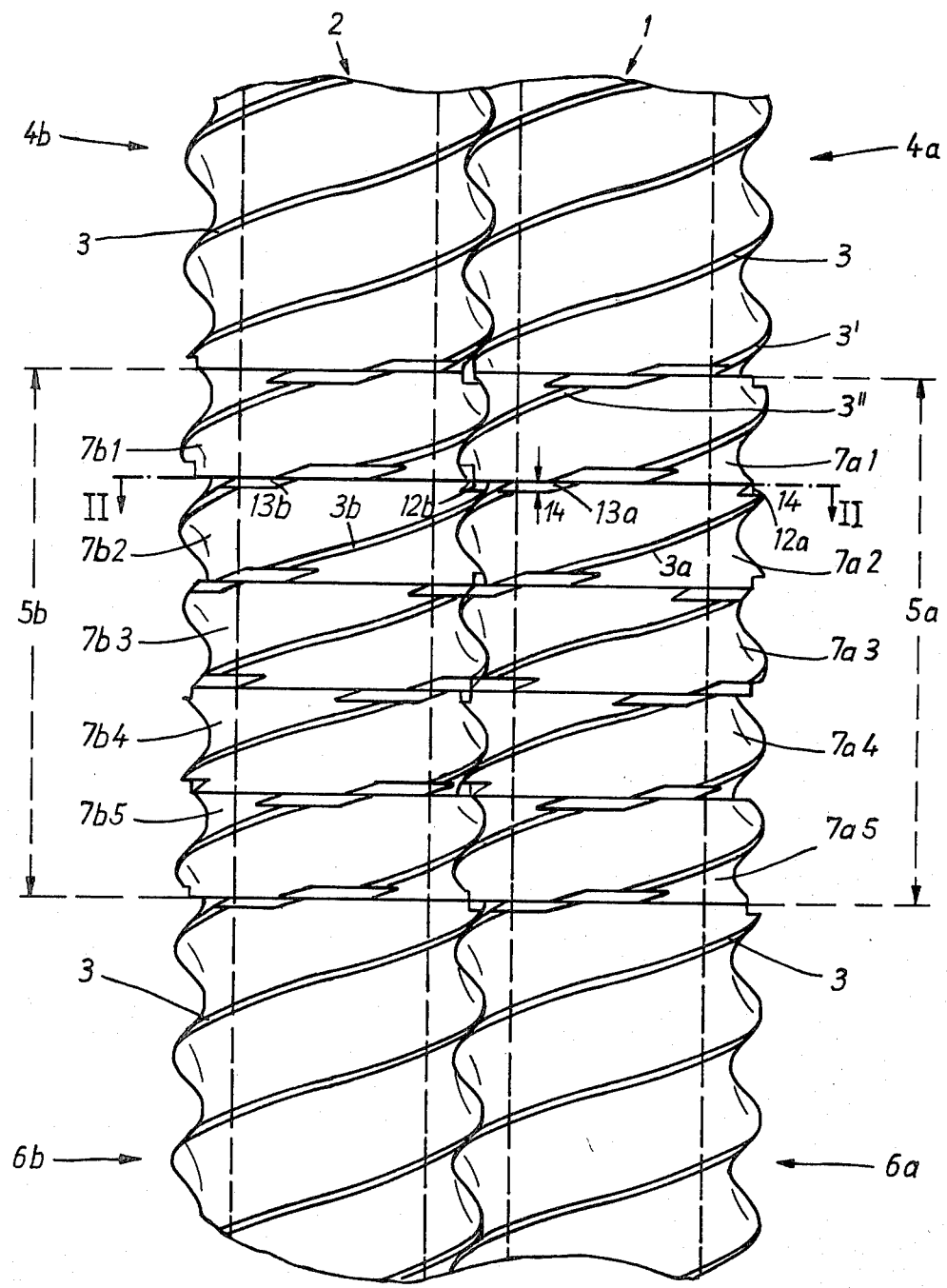
FIG. 1 is an elevational view of two parallel worm elements in accordance with the invention, constructed with similar disks in their central regions.

As shown in FIG. 1, two axis-parallel worm elements 1 and 2, according to the invention engage one another so as to form a near fit with one another, and are driven in the same sense by a standard drive (not shown). Not shown in FIG. 1 but illustrated in FIG. 2, is a housing which encloses the two worm elements 1 and 2, in wellknown fashion, so tightly that there is little play between the interior wall of the housing and the worm threads, 3, 3' 3".

The two worm elements 1 and 2 of FIG. 1 are each subdivided into three regions, 4a, 5a, and 6a and respectively 4b, 5b and 6b. The region pairs 4a/4b and 6a/6b are for pure conveyance However, the regions 5a and 5b are for homogenization and mixing and include five sets of disks 7a and 7b respectively. The disk sets 7a and 7b respectively contain worm sections which correspond to the worm pairs 4a/4b and 6a/6b respectively.

If the disks of the sets 7a and 7b were to be joined to the sections 4a/4b and 6a/6b with continuous worm pitches, without any impact points, the worm threads everywhere would be as shown in the regions 4a/4b and 6a/6b. In the region 5a/5b however, the individual disks 7a and 7b are progressively turned with respect to one another, specifically in each case by an angle of 30°. This rotation can be seen especially clearly at the transition points from region 4a to the disk 7a1, where the respectively portions 3' and 3" do not meet one another. For the impact points between the other disks 7a2–7a5 and 7b1–7b5 respectively, as well as for the connection point of the disks 7a5/7b5 to the worm elements in the region 6a/6b, the same considerations are applicable. Two disks 7a1/7b1 etc. always form a pair whose two disks 7a1 and 7b1 are respectively always turned by the same angle so that, within one pair, the respectively worm elements engage and fit into one another. Consequently, in the region of each pair, the conveyance action of the worm elements remains preserved.

FIG. 2 shows the arrangement according to FIG. 1 in a section along the line II—II, with a housing 8 which surrounds the two worm elements with little play. In FIG. 2, only the disks 7a2 and 7b2 with the two worm elements are visible. Also visible are side frontal surfaces 9a and 9b of the two disks 7a2 and 7b2 that are in contact with the respective disks 7a1 and 7a2 and 7b2 at the side surfaces 9a and 9b. The two disks 7a2 and 7b2 further more have respective 10a and 10b for drive shafts as discussed in more detail below.

The two disks 7a2 and 7b2 are rotated by the same angle in the same sense. This has no effect on the mutual engagement of the worm threads that are formed on these two disks. As before, the two worm elements engage one another so as to nearly fit together, when the two disks 7a2 and 7b2 are driven in the same sense as specified here. To this extent, the same circumstances prevail with respect to the two disks 7a2 and 7b2 as with respect to the worm portions in the regions 4a/4b and 6a/6b respectively.

Now, since the disks 7a1/7b1 etc. contact one another from pair to pair, without a gap, with their frontal sides 9a and 9b, the gears 3a and 3b, which terminate in the frontal sides 9a and 9b when the worm elements 1 and 2 rotate, also have to slide past one another while making contact. This would unavoidably lead to a mutual impacting of the frontal side if it were not for the provision of the shoulders 11a, 12a and 13a, and their respective counterparts 11b, 12b and 13b. Because of the shoulders the frontal sides of the gear portions 3a and 3b are set backwards in the axial direction with respect to the frontal side surfaces 9a and 9b. The shoulders 11a, 12a and 13a and their respective counterparts 11b, 12b and 13b, consequently form the frontal sides of the gear portions 3a and 3b, which are visible in FIG. 2.

Consequently the disks slide past one another at a distance from the respective frontal sides of the respectively neighboring pair of disks (with reference to the disks 7a2 and 7b2, and the disks 7a1 and 7b1). This distance corresponds to the width 14 of a shoulder (see disk 7a1 in FIG. 1). This simple width is obtained as the slide distance because it is always the shoulders 11a, 12a, and 13a and, respectively, 11b, 12b, and 13b, and the other shoulders of FIG. 1 that run past the frontal side surfaces of the respectively following pair.

From FIGS. 2 and 3 it can be seen that the material that is transported in a particular turn of the worm is deflected from one worm to another when it reaches the area where two worms mesh with one another. This is the wellknown function of the double worm arrangement which was described in the introduction. At the transfer point a compression results due to the deflection of the flow direction of the material. This presses the material through the shoulders 11a, 12a, and 13a and, respectively, 11b, 12b and 13b, so that a shearing of the material being processed occurs at this point. Due to the rotation of the respective disks 7a1 etc. and 7b1 etc. with respect to one another, the associated worms are disrupted in their continuous courses, which consequently disrupts the flow of the material that is being transported from the worm, and leads to the desired compression and mixing of the material.

FIG. 2 also shows that the radial distance 30 of the shoulders 11a, 12a, and 13a and, respectively, 11b, 12b and 13b from the gears 3a and 3b respectively is somewhat larger than half the pitch height 31. In any case the distance 30 is equal or greater than half the pitch height 31 so that the frontal side surfaces of two disks, which are displaced with respect to one another and which are respectively situated on another shaft, do not contact when the shafts rotate.

FIGS. 1 and 2 furthermore show that the axial width 14 of the shoulder 13 (and of other shoulders), where this axial width has been drawn in FIG. 1, corresponds maximally to the pitch height 31. According to experience, this leads to especially favorable mixing results.

As can be seen from FIGS. 2 and 3, the disks 7a2 and 7b2 (as well as the other disks of FIG. 1) have interior teeth 32 and associated gaps 33. By means of these interior teeth 32/33 the disks are mounted on their shafts so as to be secured against turning, with these shafts being equipped with corresponding teeth. The disks can then always be set on these shafts, turned by the desired angle. This makes possible that the rotation angle can be set optionally from disk to disk along a worm, and specifically at least by an angle of the tooth division of the teeth 32/33.

FIG. 4 shows an unwinding of the display of FIG. 1. Here, the line 15 represents the edge 16 of the housing 8 according to FIG. 2. The unwinding then takes place from this edge over the two worm elements 1 and 2 and, using FIG. 2 as a basis, towards the right and left up to the edge 17 of the housing 8, where said edge 17 is opposite to the edge 16. Here, in FIG. 4, lines 18 and 19 represent the edge 17. For the rest, the analogy between the display of FIG. 4 and the displays according to FIGS. 2 and 3 has been established by using the same reference symbols.

Figure 5:
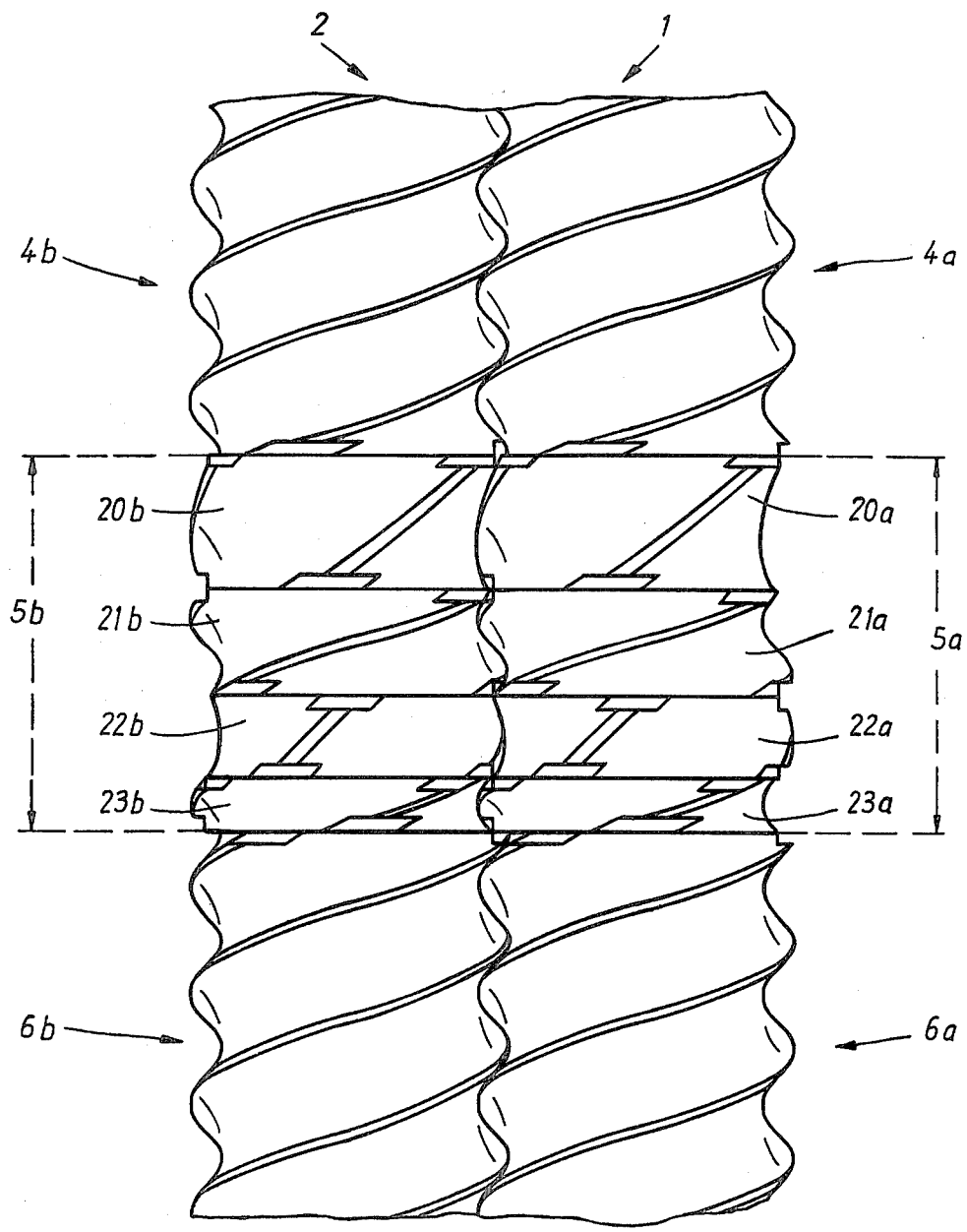
FIG. 5 is an elevational view of a modification of FIG. 1, with disks of decreasing thicknesses and different worm pitches.

The device shown in FIG. 5 involves two worm elements 1 and 2 with disks 20a-23a and respectively 20b-23b whose thickness decreases. Furthermore, the individual disks have a different worm pitch. The disks 20a and 22a and respectively 20b and 22b have a greater pitch as compared to the disks 21a and 23a and respectively 21b and 23b. Otherwise the function of the two worm elements 1 and 2 with the above mentioned disks is the same as in the arrangement according to FIG. 1.

The different disk thickness achieves the result that, along the path from the thicker disks to the thinner disks, the material is subjected to shorter time intervals to the action resulting from the above-mentioned sections (action points), so that, with increasing compression of the material on the path along the worms, an increasingly intense action is also obtained. The particular pitch that is chosen here achieves the effect that when the worms 1 and 2 are rotated, the sections which form the action points do not simultaneously reach the gear area of the worms 1 and 2 in larger numbers, which would instantaneously cause a considerable stress on the worms and thus necessarily increase the torque. As a result the torque can remain practically constant over a full rotation of the worms by 360°.

Figure 6:
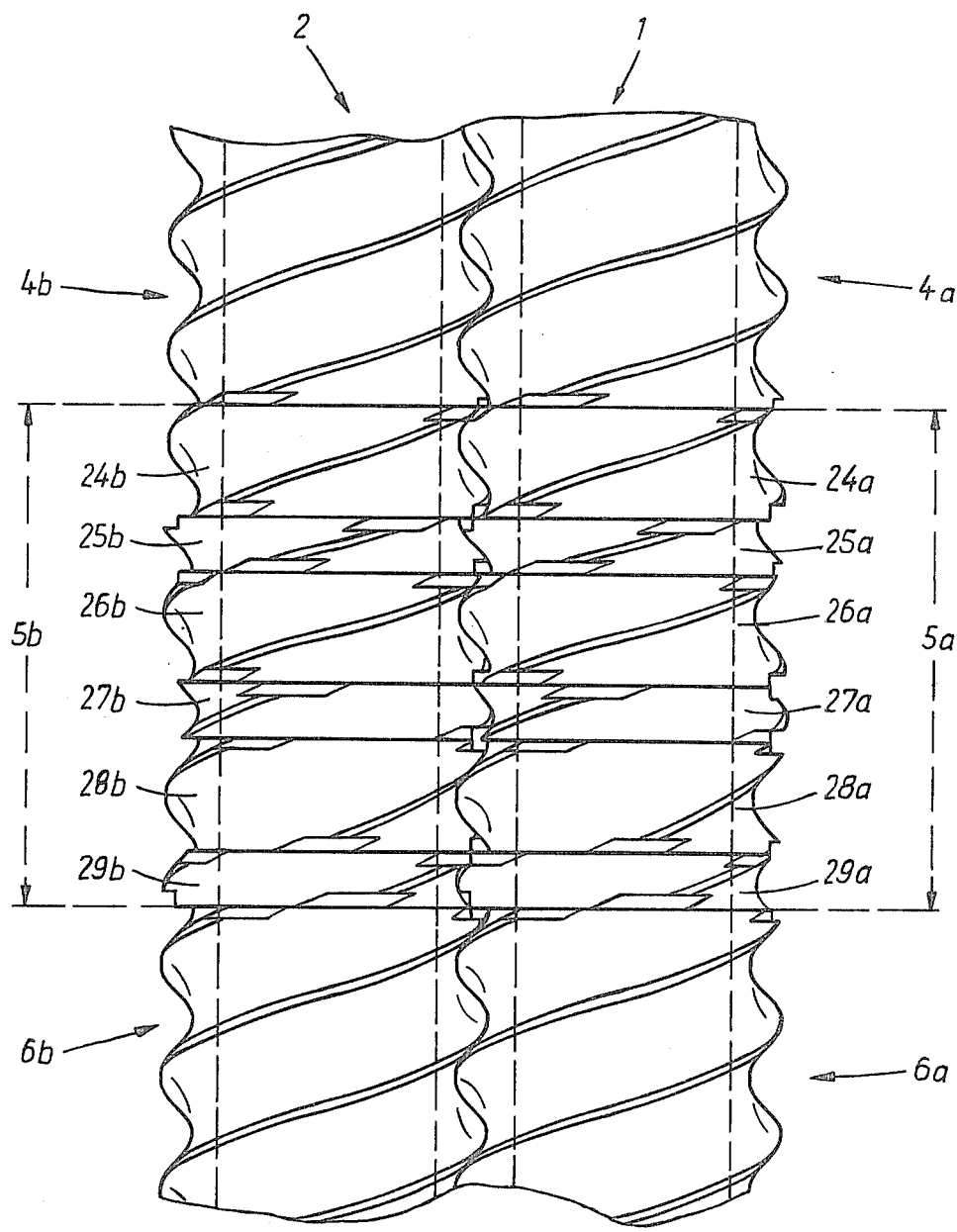
FIG. 6 is an elevational view of a further modification of FIG. 1, with disks of alternating thickness.

FIG. 6 shows a device where provision is made for disks of alternating thickness. Here the disks 24a/24b, 26a/26b and 28a/28b are much thicker as compared to the disks 25a/25b and 27a/27b. Otherwise the function of this device is the same as the device according to FIG. 1. By using disks of different thickness, one obtains the effect that a specially intense action takes place on the material, so to speak step-by-step, whereupon in the region of the thicker disks a region of less intense processing then occurs.

It should also be noted that, with all the above-described embodiments, the sections which form the action points are placed so that, in their axial sequence, they do not lie along a line, that is, not axis-parallel. With such a position, one would actually obtain the effect that a large number of action points would reach the region of engagement of the worms when the worms rotate. As a result, at that particular moment, the torque would be significantly increased, since, in this case, the worms would be stressed especially strongly. To avoid this, the sections are suitably placed.

The subdivision of the worms into successive disks as described above is applicable both to devices with two worms and to devices with more worms and, specifically in such a fashion that the worm axes lie in a plane, at the vertices of a triangle or in V-shape.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

I claim:

1. Apparatus for the homogenization and mixing of plastic materials, comprising a plurality of worm elements for homogenizing and mixing the plastic materials; each worm element comprising a plurality of successive disks with neghboring disks on the respective worm elements having the same thickness; said neighboring disks being turned through the same angle with respect to the remaining portions of the worm elements to exposed frontal side surfaces thereon with centric shoulders that permit respective frontal surfaces to move freely past one another when the worm elements rotate.

2. A device according to claim 1, characterized in that the thickness of the disks along the worm elements is chosen so that a thiner disk follows a thicker one, and this pattern is repeated.

3. A device according to claim 1, characterized in that successive disks have different helical pitches.

4. Apparatus in accordance with claim 1 wherein the disks of each worm element have a plurality of different thicknesses.

5. Apparatus in accordance with claim 4 wherein the disks progressively decrease in thickness along each worm element.

6. Apparatus as defined in claim 1 wherein the disks have shoulders with radial distances corresponding to at least half of the pitch height.

7. Apparatus as defined in claim 1 wherein the disks have shoulders with axial widths corresponding to the pitch height.

8. Apparatus as defined in claim 1 wherein the disks are fixed on the axes of the worm elements at different angular positions.

9. Apparatus as defined in claim 1 wherein the worm elements have parallel axis and pitches which run in the same directions.

10. Apparatus as defined in claim 1 wherein the successive disks have the same helical pitch.

* * * * *